(12) United States Patent
Ha et al.

(10) Patent No.: US 12,198,266 B2
(45) Date of Patent: Jan. 14, 2025

(54) METHOD AND APPARATUS WITH IMAGE PROCESSING AND RECONSTRUCTED IMAGE GENERATION

(71) Applicant: SAMSUNG ELECTRONICS CO., LTD., Suwon-si (KR)

(72) Inventors: Inwoo Ha, Seongnam-si (KR); Hyun Sung Chang, Seoul (KR); Minjung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 17/487,240

(22) Filed: Sep. 28, 2021

(65) Prior Publication Data

US 2022/0284663 A1    Sep. 8, 2022

(30) Foreign Application Priority Data

Mar. 8, 2021    (KR) .......................... 10-2021-0030200

(51) Int. Cl.
*G06T 15/50*    (2011.01)
*G06T 7/50*    (2017.01)
(Continued)

(52) U.S. Cl.
CPC .............. *G06T 15/506* (2013.01); *G06T 7/50* (2017.01); *G06T 13/40* (2013.01); *G06T 15/80* (2013.01);
(Continued)

(58) Field of Classification Search
CPC .............................. G06V 40/16; G06V 40/168
See application file for complete search history.

(56) References Cited

U.S. PATENT DOCUMENTS

| 10,665,011 B1 | 5/2020 | Sunkavalli et al. |
| 2008/0205712 A1 | 8/2008 | Ionita et al. |

(Continued)

FOREIGN PATENT DOCUMENTS

| JP | 4718491 B2 | 7/2011 |
| JP | 6407562 B2 | 10/2018 |

(Continued)

OTHER PUBLICATIONS

Tran, Luan, and Xiaoming Liu. "On learning 3d face morphable model from in-the-wild images." IEEE transactions on pattern analysis and machine intelligence 43.1 (2019): 157-171. (Year: 2019).*

(Continued)

*Primary Examiner* — Ryan McCulley
(74) *Attorney, Agent, or Firm* — NSIP Law

(57) ABSTRACT

A processor-implemented method includes: determining albedo data in a canonical space and depth data in the canonical space based on input image data including an object, using one or more neural network-based extraction models; generating deformed albedo data and deformed depth data by applying a target shape deformation value respectively to the albedo data and the depth data; generating resultant shaded data by performing shading based on the deformed depth data and a target illumination value; generating intermediate image data based on the resultant shaded data and the deformed albedo data; and generating reconstructed image data from the intermediate image data and the deformed depth data based on a target pose value.

26 Claims, 8 Drawing Sheets

(51) Int. Cl.
 *G06T 13/40* (2011.01)
 *G06T 15/80* (2011.01)
 *G06V 40/16* (2022.01)

(52) U.S. Cl.
 CPC .......... *G06V 40/168* (2022.01); *G06V 40/174* (2022.01); *G06T 2207/20084* (2013.01); *G06T 2207/30201* (2013.01)

(56) References Cited

U.S. PATENT DOCUMENTS

| | | |
|---|---|---|
| 2018/0046854 A1 | 2/2018 | Kittler et al. |
| 2020/0160593 A1 | 5/2020 | Gu et al. |
| 2020/0320777 A1 | 10/2020 | Meshry et al. |
| 2022/0198617 A1* | 6/2022 | Gafni ................. G06N 20/00 |
| 2022/0392133 A1* | 12/2022 | Volkov ............... G06V 40/165 |

FOREIGN PATENT DOCUMENTS

| | | |
|---|---|---|
| JP | 6677172 B2 | 4/2020 |
| KR | 10-2006-0129821 A | 12/2006 |

OTHER PUBLICATIONS

Thies, Justus, et al. "Real-time expression transfer for facial reenactment." ACM Trans. Graph. 34.6 (2015): 183-1. (Year: 2015).*

Brown, C. Wayne. "Diffuse Lighting." Learn WebGL, Mar. 4, 2016, https://web.archive.org/web/20160512084936/http://learnwebgl.brown37.net/09_lights/lights_diffuse.html (Year: 2016).*

Debevec, Paul, et al. "Acquiring the Reflectance Field of a Human Face." *Proceedings of the 27th annual conference on Computer graphics and interactive techniques* SIGGRAPH 2000 pp. 145-156.

Sorkine, Olga, et al. "As-Rigid-As-Possible Surface Modeling." *Symposium on Geometry processing* vol. 4, 2007 (8 pages in English).

Xiong, Ying, et al. "From Shading to Local Shape." *IEEE transactions on pattern analysis and machine intelligence* arXiv:1310.2916v2 vol. 37 No. 1 Apr. 7, 2014, pp. 1-15.

Kanazawa, Angjoo, "Single-View 3D Reconstruction of Animals" *Dissertation submitted to the Faculty of the Graduate School of the University of Maryland, College Park* 2017 (142 pages in English).

Zhu, Xiangyu, et al. "Face Alignment in Full Pose Range: A 3D Total Solution." *IEEE transactions on pattern analysis and machine intelligence* arXiv:1804.01005v12, 2018, pp. 1-14.

Sengupta, Soumyadip, et al. "SfSNet: Learning Shape, Reflectance and Illuminance of Faces 'in the wild'." *Proceedings of the IEEE conference on computer vision and pattern recognition* 2018 pp. 6296-6305.

Nestmeyer, Thomas, et al. "Learning Physics-Guided Face Relighting under Directional Light." *Proceedings of the IEEE/CVF Conference on Computer Vision and Pattern Recognition* 2020 pp. 5124-5133.

Extended European search report issued on Jul. 15, 2022, in counterpart European Patent Application No. 21217137.5 (7 pages in English).

* cited by examiner

METHOD AND APPARATUS WITH IMAGE PROCESSING AND RECONSTRUCTED IMAGE GENERATION

CROSS-REFERENCE TO RELATED APPLICATIONS

This application claims the benefit under 35 USC § 119(a) of Korean Patent Application No. 10-2021-0030200 filed on Mar. 8, 2021, in the Korean Intellectual Property Office, the entire disclosure of which is incorporated herein by reference for all purposes.

BACKGROUND

1. Field

The following description relates to a method and apparatus with image processing and reconstructed image generation.

2. Description of Related Art

Electronic devices may implement virtual reality (VR), augmented reality (AR), or mixed reality (MR). AR refers to a display technology that combines virtual objects or information with a real-world environment and displays the combination. AR may be an approach of providing a new experience to a user through a combination of an outside view and a virtual image and providing information in a more effective and immersive manner.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a processor-implemented method includes: determining albedo data in a canonical space and depth data in the canonical space based on input image data including an object, using one or more neural network-based extraction models; generating deformed albedo data and deformed depth data by applying a target shape deformation value respectively to the albedo data and the depth data; generating resultant shaded data by performing shading based on the deformed depth data and a target illumination value; generating intermediate image data based on the resultant shaded data and the deformed albedo data; and generating reconstructed image data from the intermediate image data and the deformed depth data based on a target pose value.

The determining of the albedo data and the depth data may include: determining the albedo data in the canonical space from the input image data using a neural network-based albedo extraction model; and determining the depth data in the canonical space from the input image data using a neural network-based depth extraction model.

The albedo data in the canonical space may correspond to albedo data when the object is deformed into a canonical shape which is a reference, and the depth data in the canonical space may correspond to depth data when the object is deformed into the canonical shape.

The generating of the deformed albedo data and the deformed depth data may include: performing a backward warping operation on each of the albedo data and the depth data based on the target shape deformation value.

The generating of the resultant shaded data may include: extracting a surface normal element of the object from the deformed depth data; and generating the resultant shaded data by performing the shading based on the extracted surface normal element and the target illumination value.

The generating of the resultant shaded data may include: performing the shading using second-order spherical harmonics.

The generating of the reconstructed image data may include: generating the reconstructed image data by deforming a pose of the object in each of the intermediate image data and the deformed depth data based on the target pose value, and combining the intermediate image data in which the pose of the object is deformed and depth data in which the pose of the object is deformed.

The target shape deformation value, the target illumination value, and the target pose value may be values extracted from another input image data that is different from the input image data, and an object in the other input image data may be the same as the object in the input image data.

The target shape deformation value, the target illumination value, and the target pose value may be values extracted from another image data including an object that is different from the object in the input image data.

The target shape deformation value, the target illumination value, and the target pose value may be values extracted from another input image data using a neural network-based extraction model other than the one or more neural network-based extraction models.

The target shape deformation value, the target illumination value, and the target pose value may be extracted from another image data, and the one or more extraction models may be trained by updating parameters of the one or more extraction models based on the reconstructed image data and the other image data.

In one general aspect, one or more embodiments include a non-transitory computer-readable storage medium storing instructions that, when executed by a processor, configure the processor to perform any one, any combination, or all operations and methods described herein.

In one general aspect, an apparatus includes: one or more processors configured to: determine albedo data in a canonical space and depth data in the canonical space based on input image data including an object, using one or more neural network-based extraction models; generate deformed albedo data and deformed depth data by applying a target shape deformation value respectively to the albedo data and the depth data; generate resultant shaded data by performing shading based on the deformed depth data and a target illumination value; generate intermediate image data based on the resultant shaded data and the deformed albedo data; and generate reconstructed image data from the intermediate image data and the deformed depth data based on a target pose value.

For the determining of the albedo data and the depth data, the one or more processors may be configured to: determine the albedo data in the canonical space from the input image data using a neural network-based albedo extraction model; and determine the depth data in the canonical space from the input image data using a neural network-based depth extraction model.

For the generating of the resultant shaded data, the one or more processors may be configured to: extract a surface normal element of the object from the deformed depth data;

and generate the resultant shaded data by performing the shading based on the extracted surface normal element and the target illumination value.

For the generating of the reconstructed image data, the one or more processors may be configured to: generate the reconstructed image data by deforming a pose of the object in each of the intermediate image data and the deformed depth data based on the target pose value, and combining the intermediate image data in which the pose of the object is deformed and depth data in which the pose of the object is deformed.

The target shape deformation value, the target illumination value, and the target pose value may be values extracted from another input image data using a neural network-based extraction model other than the one or more neural network-based extraction models.

An electronic apparatus may include the apparatus and a display.

In another general aspect, a processor-implemented method includes: determining albedo data in a canonical space and depth data in the canonical space based on first training image data using a neural network-based first extraction model; extracting a shape deformation value, an illumination value, and a pose value from second training image data; generating deformed albedo data and deformed depth data by applying the shape deformation value respectively to the albedo data and the depth data; generating resultant shaded data by performing shading based on the deformed depth data and the illumination value; generating intermediate image data based on the resultant shaded data and the deformed albedo data; generating reconstructed image data from the intermediate image data and the deformed depth data based on the pose value; and training the one or more extraction models by updating parameters of the one or more extraction models based on the reconstructed image data and the second training image data.

The updating of the parameters of the first extraction model may include: iteratively correcting the parameters of the first extraction model such that a difference between the reconstructed image data and the second training image data is reduced.

The extracting of the shape deformation value, the illumination value, and the pose value may include: extracting the shape deformation value, the illumination value, and the pose value from the second training image data using a neural network-based second extraction model, wherein the updating of the parameters of the first extraction model may include iteratively correcting parameters of each of the first extraction model and the second extraction model such that a difference between the reconstructed image data and the second training image data is reduced.

The method may include using the trained one or more extraction models to generate reconstructed image data from input image data including an object.

In another general aspect, an electronic apparatus includes: one or more processors configured to: determine albedo data in a canonical space and depth data in the canonical space based on input image data including an object, using one or more neural network-based extraction models; generate deformed albedo data and deformed depth data by applying a target shape deformation value respectively to the albedo data and the depth data; generate resultant shaded data by performing shading based on the deformed depth data and a target illumination value; generate intermediate image data based on the resultant shaded data and the deformed albedo data; and generate reconstructed image data from the intermediate image data and the deformed depth data based on a target pose value; and a display configured to visualize the reconstructed image data.

In another general aspect, a processor-implemented method includes: extracting target composition data from second unlabeled training image data; determining albedo data in a canonical space and depth data in the canonical space based on first unlabeled training image data using one or more neural network-based extraction models; generating reconstructed image data based on the albedo data, the depth data, and the target composition data; and training the one or more extraction models by updating parameters of the one or more extraction models based on the reconstructed image data and the second training image data.

The albedo data determined based on the first training image data may correspond to albedo data of the second training image data.

The first training image data and the second training image data may include a same object.

The first training image data and the second training image data each may include one or more images of a same image sequence of the same object.

A camera angle and a light source direction of the image sequence may be fixed, and the object may move between images of the image sequence.

In another general aspect, a processor-implemented method includes: decomposing an input image into an albedo component and a depth component using a trained neural network-based extraction model; deforming the albedo component and the depth component based on a target shape deformation value corresponding to a local geometric change of an object of the input image; shading the deformed depth component based on a target illumination value; generating an intermediate image by combining the deformed albedo component and the shaded deformed depth component; and adjusting a pose of the intermediate image based on the deformed depth component and a target pose value.

The generating of the intermediate image may include performing a vector dot product operation between the deformed albedo component and the shaded deformed depth component.

The shading of the deformed depth component may include: determining a surface normal of the deformed depth component through pixel-wise regression of local neighboring pixels of the deformed depth component; and applying an illumination element to the surface normal.

The target shape deformation value may correspond to a facial expression of the object.

Other features and aspects will be apparent from the following detailed description, the drawings, and the claims.

Figure 1:
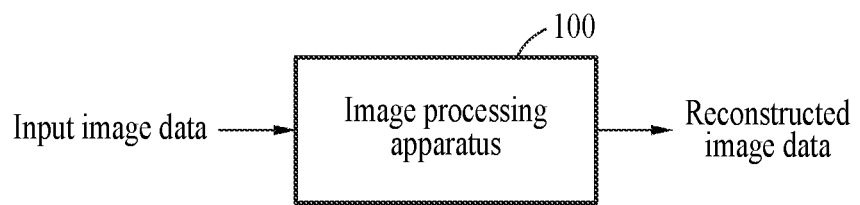
FIG. 1 illustrates an example of generating reconstructed image data.

Throughout the drawings and the detailed description, unless otherwise described or provided, the same reference numerals refer to the same or like elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application may be omitted when it is deemed that such description may cause ambiguous interpretation of the example embodiments. Hereinafter, examples will be described in detail with reference to the accompanying drawings, and like reference numerals in the drawings refer to like elements throughout.

FIG. 1 illustrates an example of generating reconstructed image data.

Referring to FIG. 1, an image processing apparatus 100 (e.g., an image processing apparatus 700 of FIG. 7) may be an apparatus configured to generate reconstructed image data from one or more sets of input image data, and be hardware or a combination of hardware and processor implementable instructions. The image processing apparatus 100 of one or more embodiments may provide more immersive content in AR than typical devices, e.g., by adjusting a characteristic of a virtual object based on a pose of a user and/or an illumination condition. The image processing apparatus 100 may include, for example, a central processing unit (CPU) and/or graphics processing unit (GPU), and generate the reconstructed image data in which a shape and/or a pose of an object included in the input image data, an illumination environment, or the like is reconstructed, using the CPU and/or GPU. The object may be, for example, a human face, a thing, or the like, but examples of which are not limited thereto and there is no limit to a type of object.

The generating of the reconstructed image data performed by the image processing apparatus 100 may be used for such applications as augmented reality (AR), image rendering, video conference, face reenactment, landmark detection, image relighting, three-dimensional (3D) user interfaces, image editing, and the like. For example, in the case of AR, to combine a real-world image and a virtual object in AR, 3D spatial modeling of the real-world image may be performed. Then, through image rendering based on the 3D spatial modeling, the virtual object having a suitable or target lighting (or illumination hereinafter) environment and pose may be generated. In this example, the image rendering may refer to a process or technique of generating an image from a 3D scene including an object using a computer program. Rendering the 3D scene may include applying a visual effect (such as, for example, an illumination effect and/or a shading effect) to the 3D scene based on the light that is output from at least one virtual light source which is a virtual light source in 3D computer graphics. By applying the illumination effect, the color of 3D models included in the 3D scene may be determined. By applying the shading effect, occlusion-based shade, reflected light, and transparency effects may be determined. These effects may be based on characteristics (e.g., color, direction, etc.) of light radiated from the virtual light source, characteristics (e.g., color, surface normal, texture, etc.) of the 3D models, and/or an arrangement relationship between the virtual light source and the 3D models. The image processing apparatus 100 may decompose image components (or "elements" hereinafter) from the input image data, deform the image elements based on a target shape deformation value, a target illumination value, and a target pose value, and generate the reconstructed image data (e.g., a reconstructed virtual object) having a suitable or determined illumination environment and pose by combining the deformed image elements.

To generate the reconstructed image data, the image processing apparatus 100 may use an image reconstruction framework based on a neural network that is trained through unsupervised learning. The image reconstruction framework may include at least one neural network that is trained with unlabeled data without a ground truth dataset. Thus, the image reconstruction framework may be trained based on a massive quantity of various sets of training data.

Figure 2:
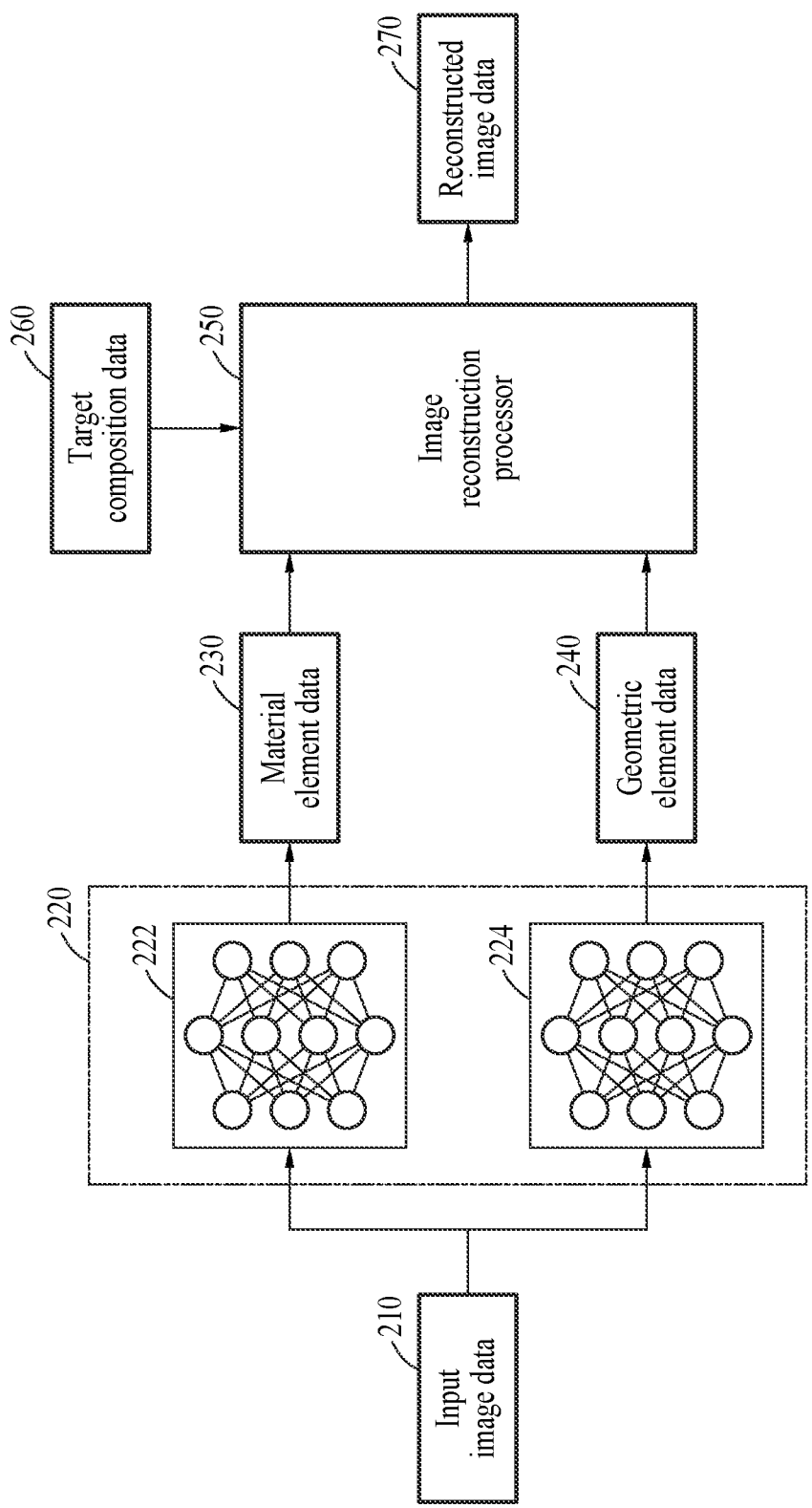
FIG. 2 illustrates an example of an image reconstruction framework.

FIG. 2 illustrates an example of an image reconstruction framework.

Referring to FIG. 2, illustrated is an example image reconstruction framework for generating reconstructed image data 270 from input image data 210. The input image data 210 including an object may be transmitted to an image processing apparatus (e.g., the image processing apparatus 100 of FIG. 1 and/or an image processing apparatus 700 of FIG. 7). For example, when the object is a face, the input image data 210 may correspond to a face image including a face region.

The image processing apparatus may determine material element data 230 and geometric element data 240 of the object from the input image data 210 using a neural network-based first extraction model 220. The first extraction model 220 may estimate the material element data 230 and the geometric element data 240 based on the input image data 210. The material element data 230 may include albedo (e.g., reflectance) data of the object, and the geometric element data 240 may include depth data of the object. The albedo data and the depth data that are determined using the first extraction model 220 may respectively correspond to albedo data in a canonical space and depth data in the canonical space that are warped into the canonical space. The canonical space may correspond to a normalized pose space. A pose of the object in the input image data 210 may vary, and the image processing apparatus may determine the albedo data and the depth data in the canonical space corresponding to a reference pose using the first extraction model 220.

The first extraction model 220 may include one or more neural networks. For example, as illustrated, the first extraction model 220 may include an albedo extraction model 222 which is a neural network for extracting the material element data 230 of the object from the input image data 210 and a depth extraction model 224 which is a neural network for extracting the geometric element data 240 of the object from the input image data 210. For another example, the first extraction model 220 may be implemented such that both the material element data 230 and the geometric element data 240 are output from a single neural network (e.g., where extraction models 222 and 224 are a same extraction model configured to output both the material element data 230 and the geometric element data 240 based on the input image data 210).

A neural network may output a value calculated with internal parameters in response to input data. At least a portion of the neural network may be hardware such as a neural processor of the image processing apparatus, or software implemented by hardware of the image processing apparatus. The neural network may be a deep neural network (DNN) that may include, as non-limiting examples, a fully connected network, a deep convolutional network, and/or a recurrent neural network. The DNN may include a plurality of layers. The layers may include an input layer, one or more hidden layers, and an output layer. The neural network may be trained to perform a given operation by mapping input data and output data that are in a nonlinear relationship based on deep learning. The deep learning may refer to a machine learning method that is employed to solve a given problem with a big dataset. The deep learning may be an optimization process of the neural network to find a point at which energy is minimized while training the neural network using prepared training data.

The image processing apparatus may generate the reconstructed image data 270 from the material element data 230, the geometric element data 240, and target composition data 260, using an image reconstruction processor 250 of the image processing apparatus. The target composition data 260 may be compositional data including one or more set values for reconstructing the input image data 210, and may include a target shape deformation value, a target illumination value, and a target pose value. The target composition data 260 may be extracted from another input image data including the same object as in the input image data 210, or extracted from another input image data including another object different from the object in the input image data 210. The target shape deformation value, the target illumination value, and the target pose value of the target composition data 260 may be extracted from the other input image data using a neural network-based second extraction model.

The image reconstruction processor 250 may deform a shape in the material element data 230 and the geometric element data 240 based on the target shape deformation value, and may generate resultant shaded data by performing shading based on the geometric element data 240 and the target illumination value. The image reconstruction processor 250 may generate the reconstructed image data 270 by performing rendering based on the resultant shaded data and the target pose value. The reconstructed image data 270 may be image data that is deformed from the input image data 210 by the target composition data 260 in terms of the shape and pose of the object and illumination. For example, when the target composition data 260 is extracted from the other input image data different from the input image data 210, the reconstructed image data 270 may be in a form of a combination of the input image data 210 and the other input image.

Through the process described above, the image processing apparatus of one or more embodiments may render the object of the input image data 210 into a viewpoint and a pose. Such a process of image processing in the image reconstruction framework described above may be effective in rendering an object into various viewpoints, poses, and illumination environments in an AR environment. Such a process of image processing in the image reconstruction framework may be performed not just on an object fixed in an image but also may be applicable to various types of moving objects.

Figure 3:
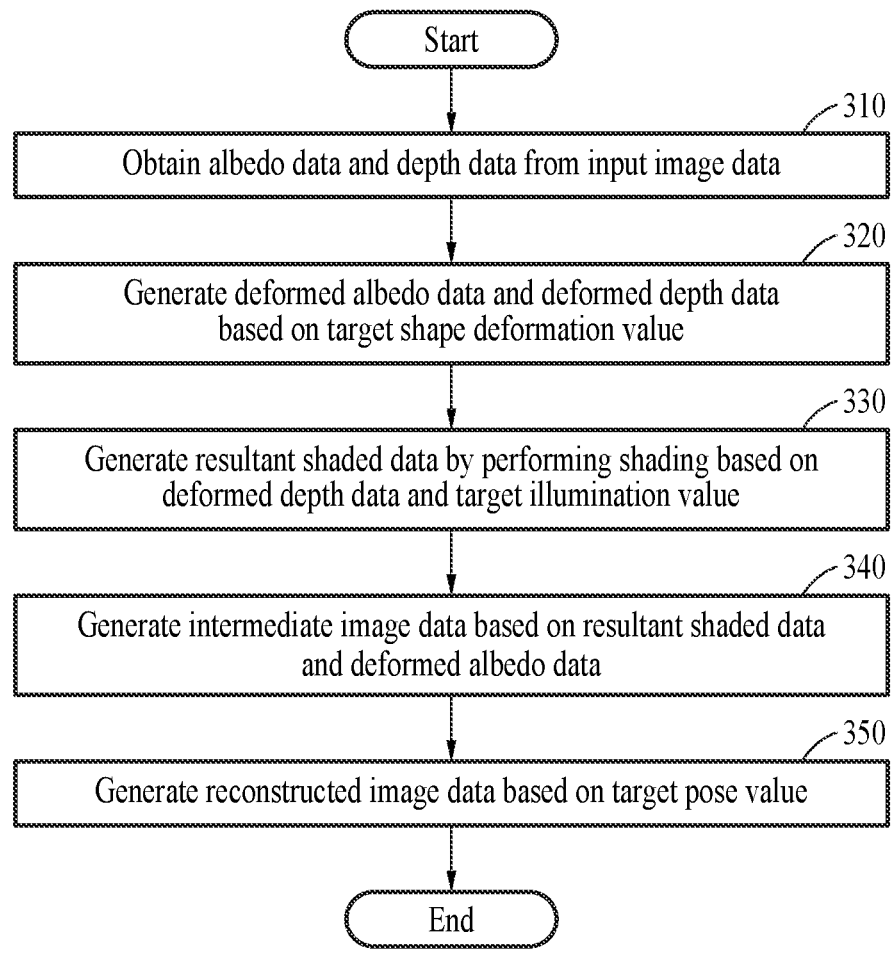
FIG. 3 illustrates an example of an image processing method of generating reconstructed image data.

FIG. 3 illustrates an example of an image processing method of generating reconstructed image data. The image processing method to be described hereinafter with reference to FIG. 3 may be performed by an image processing apparatus described herein.

Referring to FIG. 3, in operation 310, the image processing apparatus may obtain albedo data and depth data from input image data including an object. The image processing apparatus may obtain the albedo data in a canonical space and the depth data in the canonical space, using a trained neural network-based extraction model. The albedo data in the canonical space may refer to albedo data when the object is deformed into a canonical shape which is a reference. The depth data in the canonical space may refer to depth data when the object is deformed into the canonical shape.

In an example, the image processing apparatus may obtain the albedo data in the canonical space from the input image data using a neural network-based albedo extraction model, and the depth data in the canonical space from the input image data using a neural network-based depth extraction model.

In operation 320, the image processing apparatus may generate deformed albedo data and deformed depth data based on a target shape deformation value. The image processing apparatus may generate the deformed albedo data and the deformed depth data in which a shape of the object is deformed by applying the target shape deformation value respectively to the albedo data obtained in operation 310 and the depth data obtained in operation 310. The generating of the deformed albedo data and the deformed depth data may include performing a backward warping operation on each of the albedo data and the depth data based on the target shape deformation value.

In operation 330, the image processing apparatus may generate resultant shaded data by performing shading based on the deformed depth data and a target illumination value. The image processing apparatus may extract a surface normal element of the object from the deformed depth data, and generate the resultant shaded data by performing the shading based on the extracted normal element and the target illumination value. The surface normal element of the object may indicate a normal direction element of a surface of the object. The image processing apparatus may perform the shading using second-order spherical harmonics. The shading may include determining a shading value by a vector dot product between an illumination direction of a light source that is indicated by the target illumination value and the surface normal element of the object.

In operation 340, the image processing apparatus may generate intermediate image data based on the resultant shaded data and the deformed albedo data. The intermediate image data may be color image data obtained by applying the target shape deformation value and the target illumination value to the input image data. A color that is viewed at a point of the object may be affected by elements or factors such as a shape and material of the object, a light source, and a viewpoint. The color of the object may be divided into an albedo component (or a reflectance component) and a shading component. The albedo component may indicate a color or material characteristic intrinsic to the object that is determined by the shape and material of the object, and be irrelevant to the light source and the viewpoint. The shading component may indicate an illumination characteristic value that is exhibited when light emitted from the light source responds to a surface normal of the object. The intermediate image data may be generated by deforming the albedo component and the shading component of the input image data to be suitable to, or based on, a target shape deformation and a target illumination deformation and then combining them. For example, the intermediate image data may be generated by combining the deformed albedo data and the shaded data.

In operation 350, the image processing apparatus may generate reconstructed image data from the intermediate image data and the deformed depth data based on a target pose value. To generate the reconstructed image data, the image processing apparatus may deform a pose of an object included in each of the intermediate image data and the deformed depth data based on the target pose value. For example, the image processing apparatus may deform, to a pose having the target pose value, the pose of the object included in each of the intermediate image data and the deformed depth data using a projection matrix that is determined based on the target pose value. The image processing apparatus may generate the reconstructed image data by combining intermediate image data having the deformed pose of the object and deformed depth data having the deformed pose of the object.

The target shape deformation value, the target illumination value, and the target pose value may be values extracted from another input image data that is different from the input image data. An object included in the other input image data may be the same as or different from the object included in the input image data. In an example, the target shape deformation value, the target illumination value, and the target pose value may be values extracted from another input image data using a trained neural network-based second extraction model. In this example, when the other input image data is input to the second extraction model, a shape deformation value, an illumination value, and a pose value that indicate characteristics of an object included in the other input image data may be output as the target shape deformation value, the target illumination value, and the target pose value, respectively. When the reconstructed image data is generated based on the other input image data different from the input image data, such characteristics as a material or global shape of an object in the reconstructed image data may represent characteristics of the object in the input image data, and such characteristics as a local shape deformation such as a facial expression and an illumination and a pose may represent characteristics of the object in the other input image data.

Figure 4:
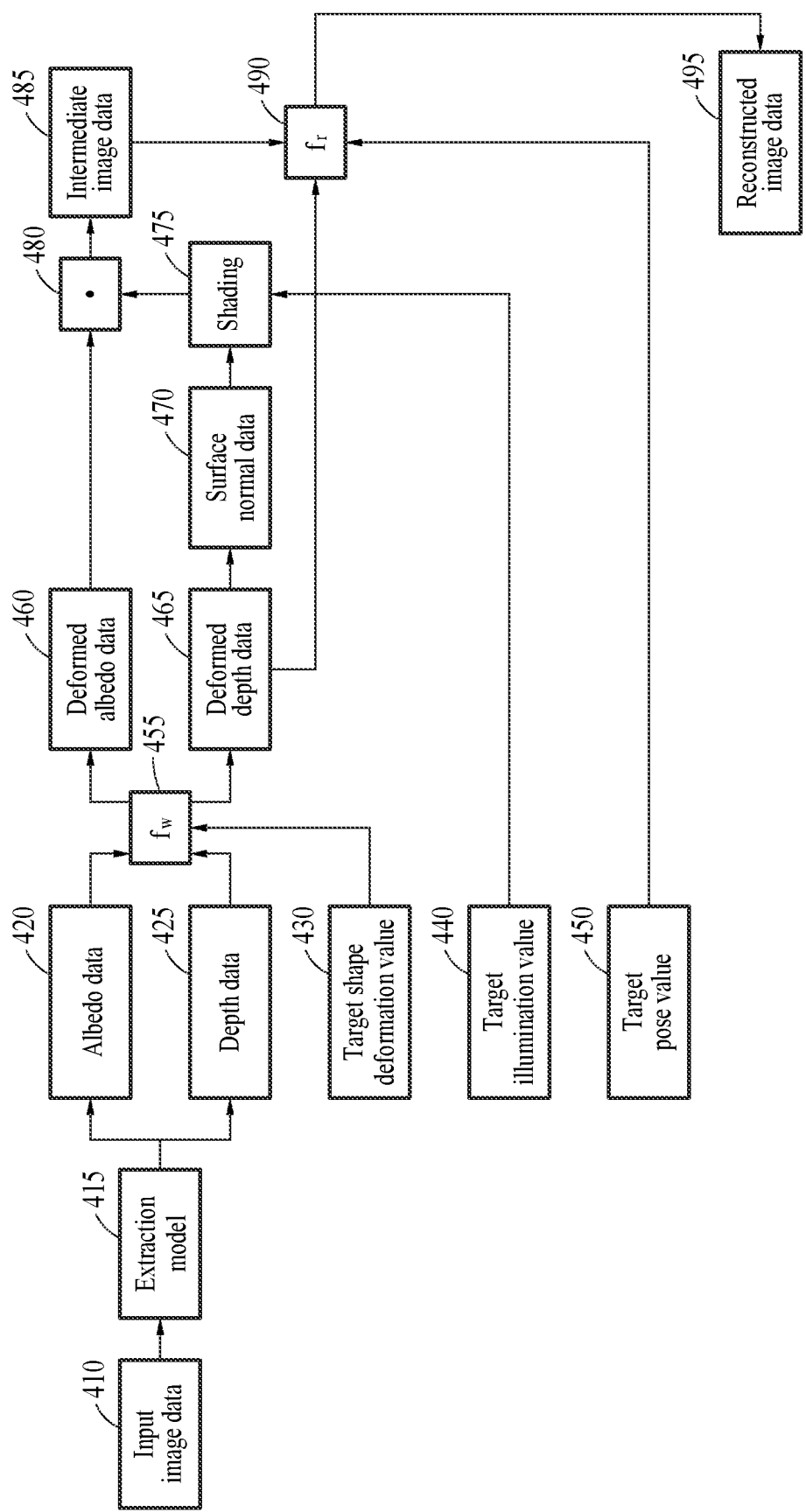
FIGS. 4 and 5 illustrate examples of generating reconstructed image data.
Figure 5:
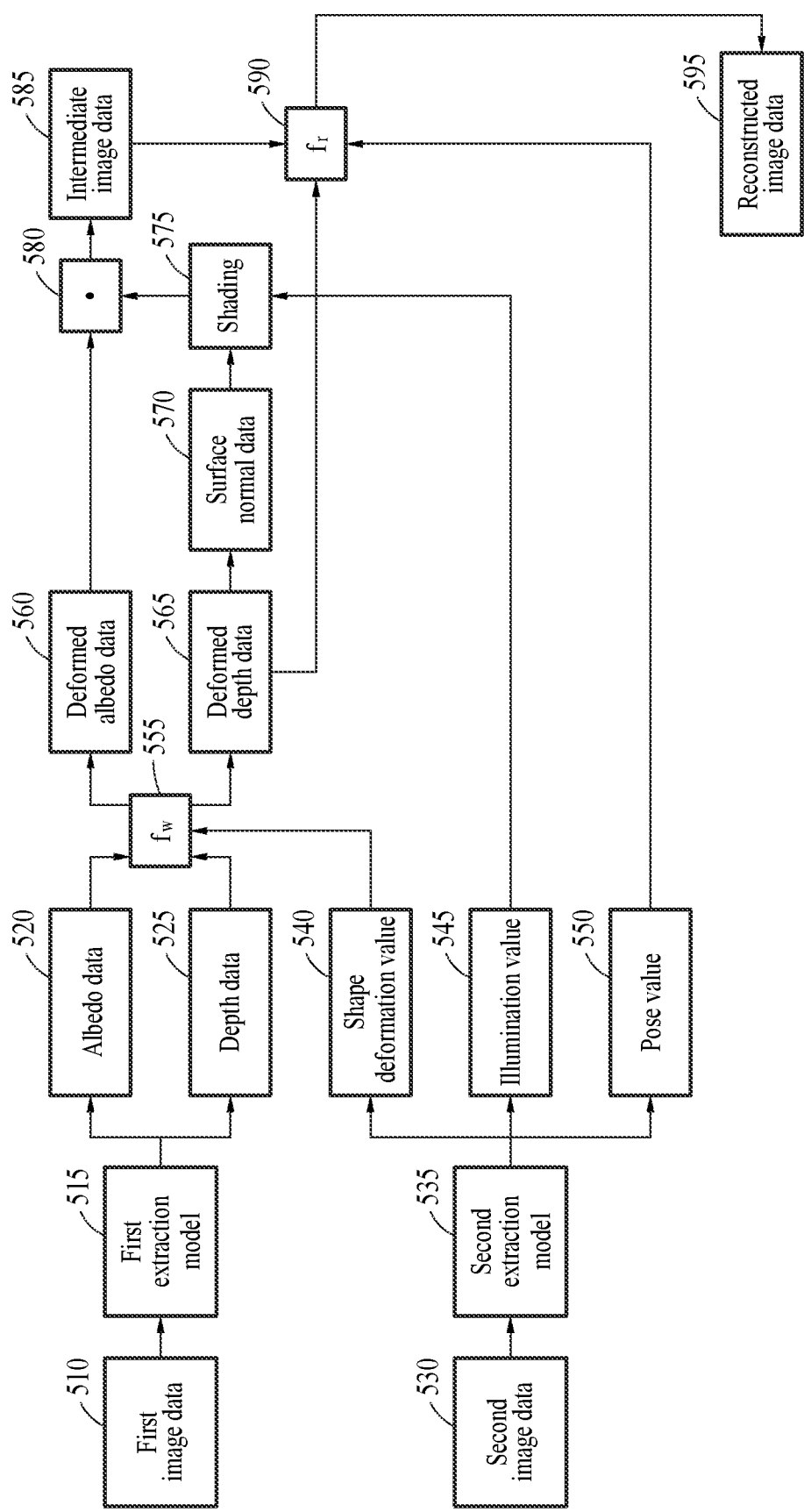

FIGS. 4 and 5 illustrate examples of generating reconstructed image data. The generating of the reconstructed image data to be described hereinafter with reference to FIGS. 4 and 5 may be performed by an image processing apparatus described herein.

Referring to FIG. 4, physical elements or factors of an object may be extracted from input image data 410 by a trained neural network-based extraction model 415 (e.g., the first extraction model 220 of FIG. 2). Using the extraction model 415, albedo data 420 in a canonical space and depth data 425 in the canonical space may be extracted from the from input image data 410. The albedo data 420 may be a material element of the object and indicate an intrinsic color of the object that is irrelevant to a viewpoint and illumination. The depth data 420 may indicate a shape of the object and be represented by a depth value in x and y coordinates. The albedo data 420 and the depth data 425 may be represented as image data having the same resolution as the input image data 410. The albedo data 420 and the depth data 425 may be attributes defining a dense point cloud of the object that is depicted on a two-dimensional (2D) regular grid.

The albedo data 420 in the canonical space and the depth data 425 in the canonical space may respectively indicate albedo data and depth data that are aligned based on a reference pose indicated by the canonical space. The canonical space may refer to a space for aligning a deformable object in a single pose space, which may be a deformation-free normalized pose space. Variables in the canonical space may be considered unchanged to all environmental conditions and/or deformations. The albedo data 420 in the canonical space and the depth data 425 in the canonical space may be independent of a deformation. For example, when the object is a face, the deformation may correspond to a facial expression.

Deformed albedo data 460 and deformed depth data 465 may be obtained by applying a target shape deformation value 430 to each of the albedo data 420 in the canonical space and the depth data 425 in the canonical space. A function $f_w$ 455 of applying the target shape deformation value 430 may be a backward warping operation that corresponds to moving a point cloud in a 3D space. The function $f_w$ 455 may define a degree of a shape deformation indicated by the target shape deformation value 430 as an amount of a 3D offset in each of x, y, and z axes for the movement of the point cloud. In addition, the function $f_w$ 455 may apply the amount of the 3D offset to each of the albedo data 420 in the canonical space and the depth data 425 in the canonical space to generate the deformed albedo data 460 and the deformed depth data 465.

The target shape deformation value 430 may be a value that reflects therein a facial expression and the like when the object is a face, and may reflect therein a local geometric change of the object. The target shape deformation value 430 may correspond to a local shape difference value from the pose in the canonical space. For example, when the pose in the canonical space is a neutral expression and a target expression is a smiling expression, the target shape deformation value 430 may correspond to a difference in shape between the neutral expression and the smiling expression.

Surface normal data 470 may be generated from the deformed depth data 465. The surface normal data 470 may indicate a geometric shape element of the object. A surface normal value of the surface normal data 470 may be calculated from the deformed depth data 465 through pixel-wise (or per-pixel) regression on local neighboring pixels. For example, when a plane that minimizes a sum of squared distances is determined based on a depth value of a current pixel and a depth value of each of neighboring pixels, a normal vector of the determined plane may be determined to be a surface normal value of the current pixel.

Subsequently, shading 475 may be performed based on the surface normal data 470 and a target illumination value 440. The target illumination value 440 may be indicated as a multidimensional vector to represent a desired or determined target illumination effect. During the shading 475, an illumination element may be applied to the surface normal data 470 by the target illumination value 440. In a Lambertian model, the shading 475 may be represented as being determined based on the surface normal data 470 and the target illumination value 440. The shading 475 may use spherical harmonics that represent a shading value for each pixel by a quadratic combination of the target illumination value 440 that is represented with the surface normal value and the multidimensional vector value. By performing the shading 475 on each pixel, resultant shaded data may be generated.

When the resultant shaded data is generated, intermediate image data 485 may be generated using a vector dot product operation 480 between the resultant shaded data and the deformed albedo data 460. The intermediate image data 485 may include diffuse color information.

Subsequently, reconstructed image data 495 may be generated based on the intermediate image data 485, the deformed depth data 465, and a target pose value 450. The target pose value 450 may be indicated by a multidimensional vector that defines a 3D transform matrix. The 3D transform matrix may include elements for translation and rotation. The target pose value 450 may define mapping on the point cloud from the canonical space to an input space. For example, when the target pose value 450 is given, a function $f_r$ 490 may send a dense point cloud associated with the deformed depth data 456 and the intermediate image data 485 to the input space, and project all points or meshes that define the shape onto a corresponding camera image plane. This may be performed by rendering. As a result of processing the function $f_r$ 490, the reconstructed image data 495 may be generated.

Through this image reconstruction framework described above, the image processing apparatus of one or more embodiments may adjust or manipulate each physical element or factor (e.g., viewpoint, illumination, pose, etc.) included in the input image data 410. The target shape deformation value 430, the target illumination value 440, and the target pose value 450 may be given, or be extracted from image data as illustrated in FIG. 5, as a non-limiting example.

Referring to FIG. 5, first image data 510 and second image data 530 that include the same object or different objects may be input to an image reconstruction framework. The first image data 510 and the second image data 530 may be image data that forms a multi-frame image.

Using a trained neural network-based first extraction model 515 (e.g., the extraction model 415 of FIG. 4), albedo data 520 in a canonical space and depth data 525 in the canonical space may be obtained from the first image data 510. Through an alignment into the canonical space, comparison and synthesis between the first image data 510 and the second image data 530 may be performed even when the first image data 510 and the second image data 530 include the same object with different poses or shapes, or when the first image data 510 and the second image data 530 include different objects.

Using a trained neural network-based second extraction model 535, physical elements or factors such as a shape deformation value 540 (e.g., an expression value), an illumination value 545, and a pose value 550 may be extracted from the second image data 530. The extracted shape deformation value 540, the extracted illumination value 545, and the extracted pose value 550 may respectively correspond to the target shape deformation value 430, the target illumination value 440, and the target pose value 450 described above with reference to FIG. 4, in an example. The first extraction model 515 and the second extraction model 535 may be provided as separate neural networks or as a single neural network. For example, an encoder-decoder network may be used as the first extraction model 515, and an encoder network may be used as the second extraction model 535.

Deformed albedo data 560 and deformed depth data 565 may be obtained by a function $f_w$ 555 of applying the shape deformation value 540 to each of the albedo data 520 in the canonical space and the depth data 525 in the canonical space. Surface normal data 570 may be generated from the deformed depth data 565, and shading 575 may be performed based on the surface normal data 570 and the illumination value 545. As a result of the shading 457, resultant shaded data may be generated. Intermediate image data 585 may be generated using a vector dot product operation 580 between the resultant shaded data and the deformed albedo data 560. Subsequently, reconstructed image data 595 may be generated by a function $f_r$ 590 of deforming a pose of an object included in each of the intermediate image data 585 and the deformed depth data 565 based on the pose value 550 and performing rendering.

Through this image reconstruction framework described above, the image processing apparatus of one or more embodiments may extract a physical element from the second image data 530, and may generate the reconstructed image data 595 in which a physical element of the first image data 510 is replaced with the corresponding physical element of the second image data 530. A repeated description of the example of FIG. 5 is omitted here for brevity, and reference may be made to what is described above with reference to FIG. 4 for a more detailed description of the example of FIG. 5.

Figure 6:
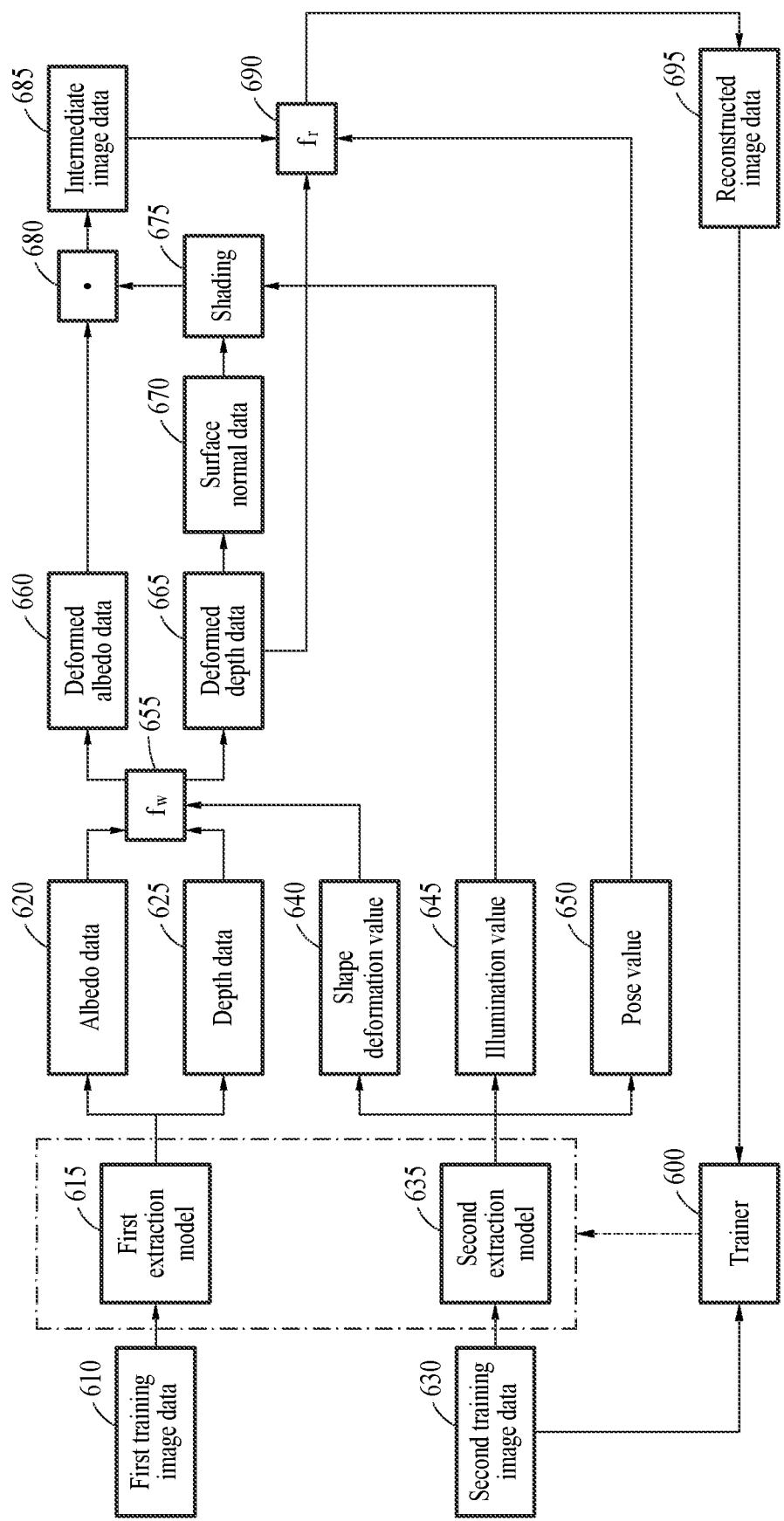
FIG. 6 illustrates an example of training extraction models.

FIG. 6 illustrates an example of training extraction models.

A training process for training a model with the image reconstruction framework described above with reference to FIG. 5 will be described hereinafter with reference to FIG. 6. The training process may include training a model on how to disentangle latent physical factors of deformable objects. The training process may be performed by a training apparatus including a processor and a memory. The training apparatus may be included in, or may correspond to, the image processing apparatus of one or more embodiments, according to non-limiting examples. The training apparatus may perform the training process using a plurality of sets of training image data that is different in terms of at least one of a shape deformation, an illumination environment, or a pose. First training image data 610 and second training image data 630 may be images selected from an image sequence that forms, for example, a multi-frame image, and the first training image data 610 and the second training image data 630 may include an object of the same type.

The training apparatus may obtain albedo data 620 in a canonical space and depth data 625 in the canonical space from the first training image data 610 including the object, using a neural network-based first extraction model 615.

The training apparatus may extract a shape deformation value 640, an illumination value 645, and a pose value 650 from the second training image data 630, using a neural network-based second extraction model 635.

The training apparatus may generate deformed albedo data 660 and deformed depth data 665 by a function $f_w$ 655 of applying the shape deformation value 640 to each of the albedo data 620 in the canonical space and the depth data 625 in the canonical space. The training apparatus may generate surface normal data 670 from the deformed depth data 665, and perform shading 675 based on the surface normal data 670 and the illumination value 645.

As a result of performing the shading 675, resultant shaded data may be generated. The training apparatus may then generate intermediate image data 685 based on the resultant shaded data and the deformed albedo data 660. The training apparatus may generate the intermediate image data 685 using a vector dot product operation 680 between the resultant shaded data and the deformed albedo data 660. The training apparatus may generate reconstructed image data 695 from the intermediate image data 685 and the deformed depth data 665 based on the pose value 650. The training apparatus may generate the reconstructed image data 695 using a function $f_r$ 690 of performing rendering based on the pose value 650, the intermediate image data 685, and the deformed depth data 665.

A trainer 600 of the training apparatus may compare the reconstructed image data 695 and the second training image data 630, and define a loss function that defines a loss based on a difference between the reconstructed image data 695 and the second training image data 630. To define the loss function, a photometric reconstruction loss may be used. The photometric reconstruction loss may be used to minimize an error between the reconstructed image data 695 and the second training image data 630.

The trainer 600 may train the first extraction model 615 and the second extraction model 635 such that the loss is reduced. The training process may include updating parameters of the first extraction model 615 and the second extraction model 635. The trainer 600 may repeatedly correct the parameters of each of the first extraction model 615 and the second extraction model 635 such that the difference between the reconstructed image data 695 and the second training image data 630 is reduced. The training process for the first extraction model 615 and the second extraction model 635 may be automatically performed such that the reconstructed image data 695 fits or matches the second training image data 630. The first extraction model 615 for which training is completed may be used as the extraction model 415 of FIG. 4 and the first extraction model 515 of FIG. 5. The second extraction model 635 for which training is completed may be used as the second extraction model 535 of FIG. 5.

This training process of one or more embodiments described above may be performed even when an object of the image sequence in the first training image data 610 and the second training image data 630 is not in a fixed position, and thus the training process described above may be performed even when the object is a moving object. The training process of one or more embodiments may be performed even without a complicated light stage, and may use numerous and various sets of training image data. In addition, the training process of one or more embodiments may use unlabeled training image data obtained from different poses and illumination conditions, enabling self-supervised or unsupervised learning.

Figure 7:
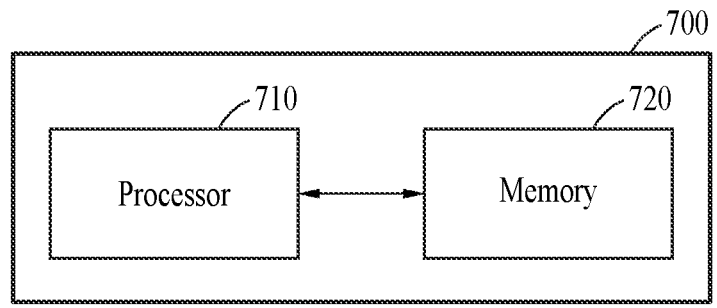
FIG. 7 illustrates an example of an image processing apparatus.

FIG. 7 illustrates an example of an image processing apparatus.

Referring to FIG. 7, an image processing apparatus 700 (e.g., the image processing apparatus 100 of FIG. 1) may be an apparatus configured to generate reconstructed image data by processing image data. The image processing apparatus 700 may include at least one processor 710 (e.g., one or more processors) and a memory 720 (e.g., one or more memories).

The memory 720 may store therein computer-readable instructions. When the instructions stored in the memory 720 are executed by the processor 710, the processor 710 may process operations defined by the instructions. The memory 720 may include, for example, a random-access memory (RAM), a dynamic RAM (DRAM), a static RAM (SRAM), or other types of nonvolatile memory that are known in the related technical field.

The processor 710 may control an overall operation of the image processing apparatus 700. The processor 710 may be a hardware-implemented device having a physically structured circuit that implements desired operations or methods. The desired operations or methods may be implemented by execution of code or instructions stored in memory. The hardware-implemented device may include, as non-limiting examples, a microprocessor, a CPU, a GPU, a processor core, a multi-core processor, a multiprocessor, an application-specific integrated circuit (ASIC), a field-programmable gate array (FPGA), and a neural processing unit (NPU).

The processor 710 may control the image processing apparatus 700 such that the image processing apparatus 700 performs one or more, or all, operations and/or methods described above with reference to FIGS. 1 through 6 and FIG. 8 discussed below.

Under the control of the processor 710, the image processing apparatus 700 may obtain albedo data in a canonical space and depth data in the canonical space from input image data including therein an object, using a neural network-based first extraction model.

In an example, the image processing apparatus 700 may obtain albedo data in a canonical space from input image data using a neural network-based albedo extraction model, and obtain depth data in the canonical space from the input image data using a neural network-based depth extraction model. The image processing apparatus 700 may generate deformed albedo data and deformed depth data by applying a target shape deformation value to each of the obtained albedo data and the obtained depth data. The image processing apparatus 700 may generate resultant shaded data by performing shading based on the deformed depth data and a target illumination value. The image processing apparatus 700 may generate the result shaded data by extracting a surface normal element of the object from the deformed depth data and performing the shading based on the extracted surface normal element and the target illumination value. The image processing apparatus 700 may generate intermediate image data based on the resultant shaded data and the deformed albedo data, and generate reconstructed image data from the intermediate image data and the deformed depth data based on a target pose value. The target shape deformation value, the target illumination value, and the target pose value may be values extracted from another input image data using a neural network-based second extraction model. The image processing apparatus 700 may generate the reconstructed image data by deforming a pose of an object included in the intermediate image data and the deformed depth data based on the target pose value and combining intermediate image data and deformed depth data in which the pose of the object is deformed.

Figure 8:
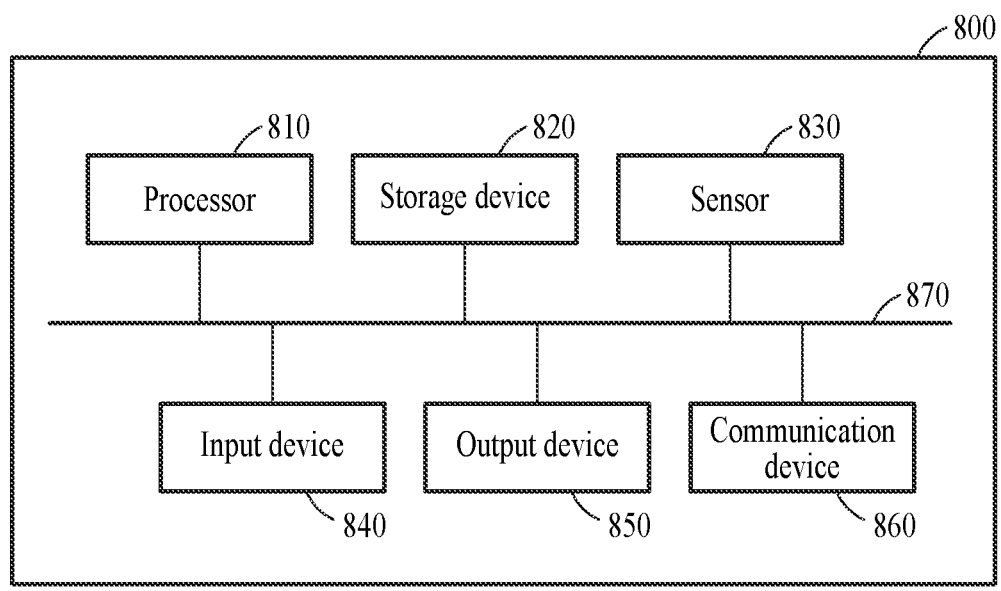
FIG. 8 illustrates an example of an electronic apparatus.

FIG. 8 illustrates an example of an electronic apparatus.

Referring to FIG. 8, an electronic apparatus 800 may generate reconstructed image data and provide a user with the generated reconstructed image data. The electronic apparatus 800 may be or include an image processing apparatus described herein (for example, the image processing apparatus 100 of FIG. 1 and/or the image processing apparatus 700 of FIG. 7), as non-limiting examples.

The electronic apparatus 800 may be a computing device, an image acquisition device, or a display device. The electronic apparatus 800 may be, for example, a personal computer (PC), an advanced driver assistance system (ADAS), a head-up display (HUD) device, a camera, a 3D digital information display (DID), a navigation device, a neuromorphic device, a 3D mobile device, a smartphone, a smart television (TV), a smart vehicle, an internet of things (IoT) device, a medical device, or the like. The 3D mobile device may include, for example, a display device configured to display AR, virtual reality (VR), and/or mixed reality (MR), a head-mounted display (HMD), a face-mounted display (FMD), and AR glasses.

The electronic apparatus 800 may include a processor 810 (e.g., one or more processors), a storage device 820 (e.g., one or more memories), a sensor 830, an input device 840, an output device 850, and a communication device 860. These components of the electronic apparatus 800 may communicate with one another through a communication bus 870.

The processor 810 may control an overall operation of the electronic apparatus 800 and implement operations or methods by execution of instructions stored in the storage device 820. The processor 810 may be configured to perform one or more, or all, operations or methods described above with reference to FIGS. 1 through 7. In an example, the processor 810 may generate reconstructed image data based on input image data. The processor 810 may obtain albedo data in a canonical space and depth data in the canonical space from the input image data, using a neural network-based extraction model. The processor 810 may generate deformed albedo data and deformed depth data by applying a target shape deformation value to each of the albedo data and the depth data. The processor 810 may generate resultant shaded data by performing shading based on the deformed depth data and a target illumination value, and generate intermediate image data based on the resultant shaded data and the deformed albedo data. The processor 810 may generate the reconstructed image data from the intermediate image data and the deformed depth data based on a target pose value. The processor 810 may be the processor 710, though examples are not limited thereto.

The storage device 820 may store information used by the processor 810 to perform operations. For example, the storage device 820 may store instructions, which when executed by the processor 810, configure the processor to perform one or more or all operations or methods described herein, as well as related information for the execution of other functions or other applications of the electronic apparatus 800. The storage device 820 may include, as a memory, an RAM, a DRAM, an SRAM, and other types of nonvolatile memory that are known in the related technical field. In addition, the storage device 820 may be a computer-readable storage medium or device, such as, for example, a storage, a magnetic hard disk, an optical disc, a flash memory device, and the like. The storage device 820 may be the memory 720 of FIG. 7, though examples are not limited thereto.

The sensor 830 may include a sensor, such as, for example, an image acquisition device configured to obtain image data, a motion sensor, and the like. The image processing apparatus may obtain the input image data and transmit the obtained input data to the processor 810.

The input device 840 may receive a user input from a user. The input device 840 may include, as non-limiting examples, a keyboard, a mouse, a touchscreen, a microphone, or other devices that detect a user input from a user and transmit the detected user input to the electronic apparatus 800.

The output device 850 may provide an output of the electronic apparatus to a user through a visual, auditory, or tactile channel. The output device 850 may include, as non-limiting examples, a display, a touchscreen, a speaker, a vibration generator, or other devices that provide an output of the electronic apparatus 800 to a user. The display may visualize the reconstructed image data generated by the processor 810 and display the visualized reconstructed image data.

The communication device 860 may communicate with an external device through a wired and/or wireless network.

The image processing apparatuses, the electronic apparatus, image reconstruction processors, processors, memories, storage devices, sensors, input devices, output devices, communication devices, communication buses, image processing apparatus 100, image reconstruction processor 250, image processing apparatus 700, processor 710, memory 720, processor 810, storage device 820, sensor 830, input device 840, output device 850, communication device 860, communication bus 870, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
   determining albedo data in a canonical space and depth data in the canonical space based on input image data including an object, using one or more neural network-based first extraction models;
   generating deformed albedo data and deformed depth data based on characteristics of the object determined from another image data different from the input image data by extracting a target shape deformation value, a target illumination value, and a target pose value from the other image data using a neural network-based second extraction model and applying the target shape deformation value respectively to the albedo data and the depth data;
   generating resultant shaded data by performing shading based on the deformed depth data and the target illumination value extracted from the other image data using the neural network-based second extraction model, including determining a shading value based on a vector operation between an illumination direction of a light source associated with the target illumination value and a direction of a surface of the object;
   generating intermediate image data based on the resultant shaded data and the deformed albedo data; and
   generating reconstructed image data from the intermediate image data and the deformed depth data based on the target pose value extracted from the other image data using the neural network-based second extraction model,
   wherein the one or more neural network-based first extraction models and the neural network-based second extraction model are trained together.

2. The method of claim 1, wherein the determining of the albedo data and the depth data comprises:
   determining the albedo data in the canonical space from the input image data using a neural network-based albedo extraction model; and
   determining the depth data in the canonical space from the input image data using a neural network-based depth extraction model.

3. The method of claim 1, wherein
   the albedo data in the canonical space corresponds to albedo data when the object is deformed into a canonical shape which is a reference, and
   the depth data in the canonical space corresponds to depth data when the object is deformed into the canonical shape.

4. The method of claim 1, wherein the generating of the deformed albedo data and the deformed depth data comprises:
   performing a backward warping operation on each of the albedo data and the depth data based on the target shape deformation value.

5. The method of claim 1, wherein the generating of the resultant shaded data comprises:
   extracting a surface normal element of the object from the deformed depth data; and
   generating the resultant shaded data by performing the shading based on the extracted surface normal element and the target illumination value.

6. The method of claim 1, wherein the generating of the resultant shaded data comprises:
   performing the shading using second-order spherical harmonics.

7. The method of claim 1, wherein the generating of the reconstructed image data comprises:
   generating the reconstructed image data by deforming a pose of the object in each of the intermediate image data and the deformed depth data based on the target pose value, and combining the intermediate image data in which the pose of the object is deformed and depth data in which the pose of the object is deformed.

8. The method of claim 1, wherein
   the target shape deformation value, the target illumination value, and the target pose value are values extracted from the other input image data that is different from the input image data, and
   an object in the other input image data is the same as the object in the input image data.

9. The method of claim 1, wherein the target shape deformation value, the target illumination value, and the target pose value are values extracted from the other image data including an object that is different from the object in the input image data.

10. The method of claim 1, wherein the target shape deformation value, the target illumination value, and the target pose value are values extracted from the other input image data including an object that is the same as the object in the input image data.

11. The method of claim 1, wherein
   the target shape deformation value, the target illumination value, and the target pose value are extracted from the other image data, and
   the one or more neural network-based first extraction models are trained by updating parameters of the one or more neural network-based first extraction models based on the reconstructed image data and the other image data.

12. A non-transitory computer-readable storage medium storing instructions that, when executed by a processor, configure the processor to perform the method of claim 1.

13. An apparatus, the apparatus comprising:
   one or more processors configured to:
      determine albedo data in a canonical space and depth data in the canonical space based on input image data including an object, using one or more neural network-based first extraction models;
      generate deformed albedo data and deformed depth data based on characteristics of the object determined from another image data different from the input image data by extracting a target shape deformation value, a target illumination value, and a target pose value from the other image data using a neural network-based second extraction model and applying the target shape deformation value respectively to the albedo data and the depth data;

generate resultant shaded data by performing shading based on the deformed depth data and the target illumination value extracted from the other image data using the neural network-based second extraction model, including determining a shading value based on a vector operation between an illumination direction of a light source associated with the target illumination value and a direction of a surface of the object;

generate intermediate image data based on the resultant shaded data and the deformed albedo data; and generate reconstructed image data from the intermediate image data and the deformed depth data based on the target pose value extracted from the other image data using the neural network-based second extraction model, wherein the one or more neural network-based first extraction models and the neural network-based second extraction model are trained together.

14. The apparatus of claim 13, wherein, for the determining of the albedo data and the depth data, the one or more processors are configured to:

determine the albedo data in the canonical space from the input image data using a neural network-based albedo extraction model; and determine the depth data in the canonical space from the input image data using a neural network-based depth extraction model.

15. The apparatus of claim 13, wherein, for the generating of the resultant shaded data, the one or more processors are configured to:

extract a surface normal element of the object from the deformed depth data; and generate the resultant shaded data by performing the shading based on the extracted surface normal element and the target illumination value.

16. The apparatus of claim 13, wherein, for the generating of the reconstructed image data, the one or more processors are configured to:

generate the reconstructed image data by deforming a pose of the object in each of the intermediate image data and the deformed depth data based on the target pose value, and combining the intermediate image data in which the pose of the object is deformed and depth data in which the pose of the object is deformed.

17. The apparatus of claim 13, wherein the target shape deformation value, the target illumination value, and the target pose value are values extracted from the other input image data including an object that is different from or the same as the object in the input image data.

18. An electronic apparatus comprising the apparatus of claim 13 and a display.

19. A processor-implemented method, the method comprising:

determining albedo data in a canonical space and depth data in the canonical space based on first training image data using a neural network-based first extraction model of one or more extraction models;

extracting a shape deformation value, an illumination value, and a pose value from second training image data using a neural network-based second extraction model of the one or more extraction models;

generating deformed albedo data and deformed depth data based on characteristics of the object determined from another image data different from the input image data by applying the shape deformation value respectively to the albedo data and the depth data;

generating resultant shaded data by performing shading based on the deformed depth data and the illumination value extracted from the other image data using the neural network-based second extraction model, including determining a shading value based on a vector operation between an illumination direction of a light source associated with the target illumination value and a direction of a surface of the object;

generating intermediate image data based on the resultant shaded data and the deformed albedo data;

generating reconstructed image data from the intermediate image data and the deformed depth data based on the pose value extracted from the other image data using the neural network-based second extraction model; and training the one or more extraction models by updating parameters of the one or more extraction models based on the reconstructed image data and the second training image data, wherein the neural network-based first extraction model and the neural network-based second extraction model are trained together.

20. The method of claim 19, wherein the updating of the parameters of the neural network-based first extraction model comprises:

iteratively correcting the parameters of the neural network-based first extraction model such that a difference between the reconstructed image data and the second training image data is reduced.

21. The method of claim 19, wherein the updating of the parameters of the neural network-based first extraction model comprises iteratively correcting parameters of each of the neural network-based first extraction model and the neural network-based second extraction model such that a difference between the reconstructed image data and the second training image data is reduced.

22. The method of claim 19, further comprising using the trained one or more extraction models to generate reconstructed image data from input image data including an object.

23. A processor-implemented method, the method comprising:

decomposing an input image into an albedo component and a depth component using a trained neural network-based first extraction model;

deforming the albedo component and the depth component based on a target shape deformation value corresponding to a local geometric change of an object of the input image, the target shape deformation value being determined, using a trained neural network-based second extraction model, based on characteristics of the object determined from another image data different from the input image data;

shading the deformed depth component based on a target illumination value extracted from the other image data using the neural network-based second extraction model, including determining a shading value based on a vector operation between an illumination direction of a light source associated with the target illumination value and a direction of a surface of the object;

generating an intermediate image by combining the deformed albedo component and the shaded deformed depth component; and adjusting a pose of the intermediate image based on the deformed depth component and a target pose value extracted from the other image data using the neural network-based second extraction model, wherein the neural network-based first extraction model and the neural network-based second extraction model are trained together.

24. The method of claim 23, wherein the generating of the intermediate image comprises performing a vector dot product operation between the deformed albedo component and the shaded deformed depth component.

25. The method of claim 23, wherein the shading of the deformed depth component comprises:
  determining a surface normal of the deformed depth component through pixel-wise regression of local neighboring pixels of the deformed depth component; and
  applying an illumination element to the surface normal.

26. The method of claim 23, wherein the target shape deformation value corresponds to a facial expression of the object.

* * * * *